US008818440B2

(12) United States Patent
Ko et al.

(10) Patent No.: US 8,818,440 B2
(45) Date of Patent: Aug. 26, 2014

(54) APPARATUS AND METHOD FOR CONTROLLING POWER IN DISTRIBUTED MULTIPLE INPUT MULTIPLE OUTPUT WIRELESS COMMUNICATION SYSTEM

(75) Inventors: Jae-Yun Ko, Anyang-si (KR); Keun-Chul Hwang, Yongin-si (KR); Seung-Won Kang, Suwon-si (KR); Soon-Young Yoon, Seoul (KR); Won-Jin Sung, Seoul (KR); Byung-Seok Lee, Seoul (KR); Ji-Won Lee, Seoul (KR)

(73) Assignees: Samsung Electronics Co., Ltd., Suwon-si (KR); Industry-University Cooperation Foundation Sogang University, Seoul (KR)

( * ) Notice: Subject to any disclaimer, the term of this patent is extended or adjusted under 35 U.S.C. 154(b) by 416 days.

(21) Appl. No.: 12/661,759

(22) Filed: Mar. 23, 2010

(65) Prior Publication Data

US 2010/0261498 A1 Oct. 14, 2010

(30) Foreign Application Priority Data

Apr. 13, 2009 (KR) .................. 10-2009-0031743

(51) Int. Cl.
*H04B 7/00* (2006.01)

(52) U.S. Cl.
USPC .......... 455/522; 455/524; 455/517; 455/501; 455/13.4; 455/56.1

(58) Field of Classification Search
CPC .... H04B 7/0417; H04B 7/0617; H04B 7/024; H04B 7/0452; H04B 7/0643; H04B 7/0697; H04W 52/40
See application file for complete search history.

(56) References Cited

U.S. PATENT DOCUMENTS

| 2006/0146725 | A1* | 7/2006 | Li et al. ................. 370/252 |
| 2007/0274404 | A1* | 11/2007 | Papandriopoulos et al. . 375/260 |
| 2009/0323849 | A1* | 12/2009 | Bala et al. .................. 375/267 |
| 2010/0182967 | A1* | 7/2010 | Zorba Barah et al. ........ 370/329 |

FOREIGN PATENT DOCUMENTS

| CN | 1885735 | 12/2006 |
| CN | 101340218 | 1/2009 |
| KR | 1020060135162 A | 12/2006 |
| WO | WO 2009/000329 A1 | 12/2008 |

OTHER PUBLICATIONS

European Search Report dated Aug. 20, 2010 in connection with European Patent Application No. EP 10 15 6960.

(Continued)

*Primary Examiner* — Yuwen Pan
*Assistant Examiner* — Fanghwa Wang

(57) ABSTRACT

An apparatus is operable to control power of a base station in a distributed Multiple Input Multiple Output (MIMO) wireless communication system. At least one beamforming matrix is used for processing transmission signals to terminals included in a terminal set for a multiple access is determined. Minimum power values required for satisfying a minimum transmission rate of the terminals are determined. Whether optimum power values exist is determined using the minimum power values, the beamforming matrix, and a limit transmission power of the base station. When the optimum power values exist, transmission power values for respective terminals are determined in a range meeting the limit transmission power of the base station.

24 Claims, 7 Drawing Sheets

(56) References Cited

OTHER PUBLICATIONS

Gema Pinero, et al., "An Efficient Algorithm for Downlink Cooperative Transmission Using Joint Power Control and Beamforming", 2004 IEEE Sensor Array and Multichannel Signal Processing Workshop, p. 513-517.

Peter W.C. Chan, et al., "Reduced-Complexity Power Allocation in Zero-forcing MIMO-OFDM Downlink System with Multiuser Diversity", ISIT, Sep. 4, 2005, 5 pages.

Taesang Yoo, et al., "On the Optimality of Multiantenna Broadcast Scheduling Using Zero-Forcing Beamforming", IEEE Journal on Selected Areas in Communications, vol. 24, No. 3, Mar. 2006, 14 pages.

Chinese Office Action dated Aug. 2, 2013 in connection with Chinese Application No. 201010164500.0, 15 pages.

\* cited by examiner

APPARATUS AND METHOD FOR CONTROLLING POWER IN DISTRIBUTED MULTIPLE INPUT MULTIPLE OUTPUT WIRELESS COMMUNICATION SYSTEM

CROSS-REFERENCE TO RELATED APPLICATION(S) AND CLAIM OF PRIORITY

The present application claims the benefit under 35 U.S.C. §119(a) of a Korean patent application filed in the Korean Intellectual Property Office on Apr. 13, 2009 and assigned Serial No. 10-2009-0031743, the entire disclosure of which is hereby incorporated by reference.

TECHNICAL FIELD OF THE INVENTION

The present invention relates to a Multiple Input Multiple Output (MIMO) wireless communication system. More particularly, the present invention relates to maximizing transmission efficiency through power control in a distributed MIMO wireless communication system.

BACKGROUND OF THE INVENTION

A multiple antenna system may utilize spatial diversity for a given bandwidth using a beam pattern, and suppress and cancel interference generated between multiple access users. Examples of a linear beamforming technique at a transmission end include Equal Gain Transmission (EGT) that transmits the same transmission power between transmission antennas, Space-Time Block Coding (STBC), Zero Forcing (ZF) beamforming, Minimum Mean Square Estimate (MMSE), and the like. The ZF beamforming shows an excellent performance when correlation between channels of multiple accessing terminals is low, and another factor that determines a performance of the ZF beamforming is powers to be allocated to each terminal. Therefore, a high performance gain with respect to the same power allocation technique may be obtained by allocating power differently for each terminal under a limited transmission power condition.

Recently, a distributed MIMO technique or a cooperative transmission technique for performing simultaneous transmission on a plurality of terminals using antennas of geographically distributed base stations on the same channel. The number of terminals included in a multiple access terminal set needs to be smaller than or the same as the number of antennas where cooperative transmission is performed, and a ZF beamforming vector is formed through a channel inverse transform process. An interference between terminals is cancelled by the ZF beamforming, and a power allocated to each terminal is limited by a power gain by the ZF beamforming and a limit power for each terminal. A water-filling power control widely used for the conventional multiple carrier system or centralized multiple antenna system operates under a condition where a limit transmission power condition for sum of powers allocated to respective terminals is given. However, since a limit transmission power condition exists for each antenna in the case of the distributed MIMO technique, a power control technique that reflects this condition needs to be applied. According to the water-filling based power control technique, since high power is allocated when a channel gain is large and low power is allocated when a channel gain is small, there is high possibility that a minimum Signal-to-Noise Ratio (SNR) level for information transmission may not be met and so transmission-not-allowed state may exist, or a minimum transmission rate requirement condition may not be met. Therefore, a power control technique for considering transmission limit power for each antenna, and simultaneously, reducing a transmission-not-allowed probability generated in the water-filling based power control technique, and meeting a minimum transmission rate requirement condition for each terminal needs to be proposed.

SUMMARY OF THE INVENTION

To address the above-discussed deficiencies of the prior art, it is a primary aspect of the present invention to provide an apparatus and a method for enhancing a transmission efficiency through power control in a distributed MIMO wireless communication system.

Another aspect of the present invention is to provide an apparatus and a method for performing power control with consideration of a transmission power limit for each antenna in a distributed MIMO wireless communication system.

Still another aspect of the present invention is to provide an apparatus and a method for optimizing a terminal set for a multiple access in a distributed MIMO wireless communication system.

In accordance with an aspect of the present invention, a method for controlling power of a base station participating in cooperative transmission in a Multiple Input Multiple Output (MIMO) wireless communication system is provided. The method includes determining at least one beamforming matrix for processing transmission signals to terminals included in a terminal set for a multiple access, determining minimum power values required for a minimum transmission rate of the terminals, determining whether optimum power values exist using the minimum power values, the beamforming matrix, and a limit transmission power of the base station, and when the optimum power values exist, determining transmission power values for respective terminals in a range meeting the limit transmission power of the base station.

In accordance with another aspect of the present invention, an apparatus of a base station that participates in cooperative transmission in a Multiple Input Multiple Output (MIMO) wireless communication system is provided. The apparatus includes a calculator that determines at least one beamforming matrix for processing transmission signals to terminals included in a terminal set for a multiple access, and an allocator that determines minimum power values required for a minimum transmission rate of the terminals, determines whether optimum power values exist using the minimum power values, the beamforming matrix, and a limit transmission power of a base station, and when the optimum power values exist, determines transmission power values for respective terminals in a range meeting the limit transmission power of the base station.

Other aspects, advantages and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller"

means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 5C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

Exemplary embodiments of the present invention provide a technique for enhancing transmission efficiency through power control in a distributed MIMO wireless communication system. Though the present invention is described using an Orthogonal Frequency Division Multiple (OFDM)/Orthogonal Frequency Division Multiple Access (OFDMA) wireless communication system as an example, the present invention is applicable to a wireless communication system of a different scheme.

Figure 1:
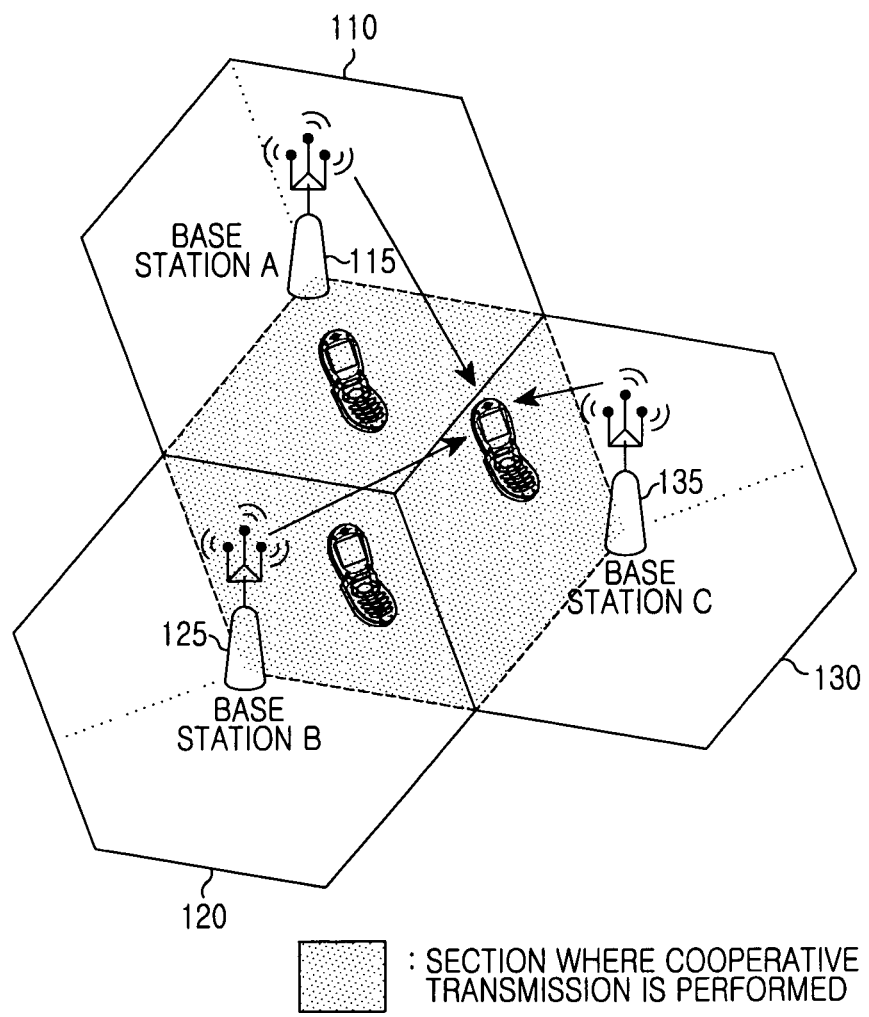
FIG. 1 illustrates a distributed MIMO wireless communication system according to an exemplary embodiment of the present invention.

An exemplary embodiment of the present invention considers a distributed MIMO wireless communication system illustrated in FIG. 1. Referring to FIG. 1, each of cells 110, 120, and 130 include three sectors, and sectors inside the same cell do not have an influence on other sectors. In addition, cooperative transmission is performed through one sector per cell, that is, three sectors included in different cells, and base stations 115, 125, and 135 share channel information of terminals through a wired line or an exclusive line. At this point, it is assumed that the base stations 115, 125, and 135 use the same frequency band, that is, a frequency reuse coefficient is "1." However, the schematic construction of the system illustrated in FIG. 1 is a mere example, and the exemplary embodiment of the present invention is applicable to a distributed MIMO system of a different structure.

Description of a power control procedure according to an exemplary embodiment of the present invention will be made to the case where a terminal has one reception antenna, and to the case where a terminal has a plurality of reception antennas.

First, the case where a terminal has one reception antenna will be described.

When a base station has one transmission antenna per sector and a terminal has one reception antenna, ZF beamforming is realized by inverse transform of a channel. In the case where a channel status does not change while data transmission is performed and base stations participating in cooperative transmission are synchronized, signals received in K terminals having one reception antenna from N base stations having one transmission antenna are given by Equation 1:

$$y = HWPd + z = \begin{bmatrix} h_1^T \\ \vdots \\ h_K^T \end{bmatrix} [w_1, \ldots w_K] \begin{bmatrix} \sqrt{p_1 d_1} \\ \vdots \\ \sqrt{p_K d_K} \end{bmatrix} + \begin{bmatrix} z_l \\ \vdots \\ z_K \end{bmatrix} \quad [\text{Eqn. 1}]$$

$$w_K = h_k^+, P = \text{diag}(\sqrt{p_1}, \ldots \sqrt{p_K})$$

where y is a reception signal matrix, H is a channel matrix, W is a beamforming matrix, P is a power vector, d is a data symbol matrix, z is a noise matrix, $h_k$ is a channel vector of a terminal k, $w_k$ is a beamforming vector of a terminal k, $p_k$ is power allocated to a terminal k, $d_k$ is a data symbol vector to a terminal k, and $z_k$ is a noise vector for a terminal k.

A Signal to Noise and Interference Ratio (SINR) for each terminal is determined using Equation 2:

$$SINR_k = \frac{P_k}{\sigma_k^{thermal} + \sigma_k^{interf}} \quad [\text{Eqn. 2}]$$

where $SINR_k$ is an SINR for a terminal k, $p_k$ is power allocated to a terminal k, $\sigma_k^{thermal}$ is a thermal noise power experienced by a terminal k, and $\sigma_k^{int\ erf}$ is noise power from an external cell experienced by a terminal k.

At this point, a limit transmission capacity per unit bandwidth is expressed by Equation 3:

$$r_k = \log_2(1 + SINR_k) \quad [\text{Eqn. 3}]$$

where $r_k$ is a limit transmission capacity per unit bandwidth of a terminal k, and $SINR_k$ is an SINR for a terminal k.

With consideration of transmittable maximum power of each base station, a constraint condition for limit transmission power of each base station is given by Equation 4:

$$\sum_{k=1}^{K} p_k |w_{nk}|^2 \le P_{max}, n = 1, \ldots, N \quad [\text{Eqn. 4}]$$

where K is the number of multiple accessing terminals, $p_k$ power allocated to a terminal k, $w_{nk}$ is an n-th element of a beamforming vector of a terminal k, $P_{max}$ is a limit transmission power of each base station, and N is the number of base stations participating in cooperative transmission.

In the case of allocating the same power to each terminal, a size of the allocated power is derived from Equation 4 and obtained by Equation 5:

$$\bar{p} = \frac{P_{max}}{\max_n \sum_{k=1}^{K} |w_{nk}|^2} \quad [\text{Eqn. 5}]$$

where $\bar{p}$ is power allocated to each terminal, K is the number of multiple accessing terminals, $w_{nk}$ is an n-th element of a beamforming vector of a terminal k, $P_{max}$ is limit transmission power of each base station, and N is the number of base stations participating in cooperative transmission.

A power allocation problem of satisfying a minimum transmission rate for each terminal, while simultaneously maximizing a system transmission rate is summarized in Equation 6:

$$\max \sum_{k=1}^{K} \log_2\left(1 + \frac{p_k}{\sigma_k^2}\right) \quad [\text{Eqn. 6}]$$

$$\text{s.t. } p_k \geq 0, k = 1, \ldots, K,$$

$$\sum_{k=1}^{K} p_k |w_{nk}|^2 \leq P_{max}, n = 1, \ldots, N,$$

$$\log_2\left(1 + \frac{p_k}{\sigma_k^2}\right) \geq r_k^{min}, k = 1, \ldots, K$$

where K is the number of multiple accessing terminals, $p_k$ is power allocated to a terminal k, $\sigma_k^2$ is noise power experienced by a terminal k, $w_{nk}$ is an n-th element of a beamforming vector of a terminal k, $P_{max}$ is a limit transmission power of each base station, and $r_k^{min}$ is a minimum transmission rate for a terminal k.

A limitation for the minimum transmission rate shown in Equation 6 is linearly expressed by Equation 7:

$$p_k \geq \sigma_k^2(2^{r_k^{min}}-1) \equiv p_k^{min}, k=1,\ldots,K \quad [\text{Eqn. 7}]$$

where $p_k$ is power allocated to a terminal k, $\sigma_k^2$ is noise power experienced by a terminal k, $r_k^{min}$ is a minimum transmission rate for a terminal k, and $p_k^{min}$ is minimum power for satisfying a minimum transmission rate.

An optimization problem of Equation 6 may be changed into Equation 8 using a Karush-Kuhn-Tucker (KKT) condition equation.

$$p_k = \left[\frac{1}{\ln 2} \frac{1}{\sum_{n=1}^{N} \lambda_n |w_{nk}|^2} - \sigma_k^2\right] \quad [\text{Eqn. 8}]$$

$$p_k^* = \max[p_k, p_k^{min}]$$

$$\sum_{k=1}^{K} p_k^* |w_{nk}|^2 \leq P_{max}, n = 1, \ldots, N$$

where $p_k$ is power allocated to a terminal k, N is the number of base stations participating in cooperative transmission, $\lambda_n$ is a constraint condition included in Equation 8, that is, a Lagrangian multiplier for a constraint condition for limit transmission power of an n-th base station, $w_{nk}$ is an n-th element of a beamforming vector of a terminal k, $\sigma_k^2$ is noise power experienced by a terminal k, $p_k^*$ is a larger value of a power value and a minimum power value allocated to a terminal k, and is a power value finally allocated to a terminal k, $p_k^{min}$ is minimum power for satisfying a minimum transmission rate, K is the number of multiple accessing terminals, and $P_{max}$ is a limit transmission power of each base station.

A base station may obtain a power value for each terminal that maximizes a transmission efficiency by determining solution of Equation 8. For example, in the case of using a repetitive technique that uses a sub-gradient, a solution of Equation 8 is determined as in Equation 9:

$$\lambda_b^{(l+1)} = \left[\lambda_n^{(l)} + t^{(l)}\left(\sum_{k=1}^{K} p_k^* |w_{nk}|^2 - P_{max}\right)\right]^+ \quad [\text{Eqn. 9}]$$

where $\lambda_n^{(l)}$ is a Lagrangian multiplier for a constraint condition for limit transmission power of an n-th base station in a repetition step, $t^{(l)}$ is a variable for controlling a size of increase/decrease, K is the number of multiple accessing terminals, $p_k^*$ is a larger value of a power value and a minimum power value allocated to a terminal k, and is a power value finally allocated to a terminal k, $w_{nk}$ is an n-th element of a beamforming vector of a terminal k, $P_{max}$ is limit transmission power of each base station, and $[x]^+$ is an operator for converting x into a real number value equal to or greater than 0. For example, when x is less than 0, $[x]^+$ is 0, and when x is a real number greater than 0, $[x]^+$ is x.

As described above, a power value for each terminal is determined using Equation 8, but a solution of an optimization problem may not always exist. That is, when minimum power values for accomplishing a minimum transmission rate meeting Equation 7 do not meet a limitation of maximum power shown in Equation 6, a solution does not exist. In this case, it is preferable to allow a solution to exist by relieving constraint conditions. For example, it may be possible to allow a solution to exist by removing at least one terminal from K terminals which are multiple access objects. At this point, since determining at least one terminal to be removed from K terminals is a problem of combination, it is not easy to find an optimum solution and a very large amount of calculations is required. Therefore, an exemplary embodiment of the present invention proposes a technique for removing a terminal step by step. A terminal to be removed is determined as in Equation 10:

$$\overset{*}{k} = \arg \max_k p_k^{min} \quad [\text{Eqn. 10}]$$

where k* is an index of a terminal to be removed, k is an index of a terminal, and $p_k^{min}$ is minimum power of a terminal k.

According to Equation 10, when minimum transmission rates of respective terminals are the same, a terminal that experiences a maximum noise is removed. That is, a terminal that experiences a serious external interference such as a terminal located in a cell boundary is removed. According to an exemplary embodiment of the present invention, a terminal to be removed is determined as in Equation 11:

$$\overset{*}{k} = \arg \max_k \sum_{n=1}^{N} |w_{nk}|^2 \qquad [\text{Eqn. 11}]$$

where k* is an index of a terminal to be removed, k is an index of a terminal, N is the number of base stations, and $w_{nk}$ is an n-th element of a beamforming vector of a terminal k.

A power control algorithm described using Equations 1 to 11 is summarized in Table 1. An algorithm shown in Table 1 regards all of base stations participating in cooperative transmission as one entity.

TABLE 1 step 0  Deterime a set of multiple accessing terminals.
        S = {1, 2, ..., K}
step 1  Determine a set of minimum powers for satisfying a minimum
        transmission rate of terminals.
        P = {$P_k^{min}$|k ∈ S}
step 2  Determine whether a solution exists.

$$\sum_{k \in S} P_k^{min} |W_{nk}|^2 - P_{max} \leq 0, \, \forall \, n = 1, \ldots N$$

If above equation is met, proceed step 3.
        Else, update the set of multiple accessing terminals according to
        Equation 10 or Equation 11, and proceed step 1.
step 3  1) Initialize Lagrangian multipliers $\lambda_1, \lambda_2, \ldots$.
        2) Determine powers allocated to terminals according to Equation 8.
        3) Update Lagrangian multipliers according to Equation 8.
        4) If the powers converge, finish this procedure.
        Else, re-perform 2) and 3).

In Table 1, S is a set of multiple accessing terminals, K is the number of multiple accessing terminals, P is a set of minimum powers for satisfying a minimum transmission rate of terminals, and $p_k^{min}$ is minimum power for satisfying a minimum transmission rate.

Next, the case where a terminal has a plurality of reception antennas is described.

In the following description, it is assumed that downlink data transmission is performed over the same channel between N base stations and K terminals, and each base station uses N transmission antennas and each terminal uses M reception antennas. In this case, a reception signal to each terminal is given by Equation 12:

$$y_k = H_k V_k P_k d_k + \sum_{l \neq k} H_k V_l P_l d_l + z_k \qquad [\text{Eqn. 12}]$$

$$V_k \in C^{NLXM}$$

$$P_k = \text{diag}(\sqrt{p_{k,1}}, \ldots, \sqrt{p_{k,M}}),$$

$$d_k = (d_{k,1}, \ldots, d_{k,M})^T,$$

where $y_k$ is a reception signal of a terminal k, $H_k$ is a channel matrix of a terminal k, $V_k$ is a beamforming matrix for a terminal k, $P_k$ is a transmission power vector for a terminal k, $d_k$ is a data symbol vector to a terminal k, $z_k$ is a noise vector experienced by a terminal k, $C^{NLXM}$ is a code book, $p_{k,m}$ is transmission power for an m-th stream of a terminal k, and $d_{k,m}$ is a data symbol for an m-th stream of a terminal k. Here, the beamforming matrix is determined through a Block Diagonalization (BD) operation for a channel matrix.

A reception signal of a terminal k given by Equation 12 includes an interference between signals transmitted to the terminal k. Therefore, to cancel the interference, a reception signal processing of Equation 13 is applied.

$$U_k^H y_k = U_k^H H_k V_k P_k d_k + U_k^H z_k \qquad [\text{Eqn. 13}]$$

$$= \Sigma_k P_k d_k + U_k^H z_k$$

where $U_k$ is a matrix for canceling an interference between signal's of a terminal k, $y_k$ is a reception signal of a terminal k, $H_k$ is a channel matrix of a terminal k, $V_k$ is a beamforming matrix for a terminal k determined according to a BD technique, $P_k$ is a transmission power matrix for a terminal k, $d_k$ is a data symbol vector to a terminal k, $z_k$ is a noise vector experienced by a terminal k, and $\Sigma_k$ is a diagonalized channel matrix of a terminal k.

At this point, a data transmission rate per unit bandwidth of each terminal is expressed by Equation 14 according to a channel capacity equation.

$$r_k = \log_2 \det\left(I_{M \times M} + \frac{\Sigma_k^2 P_k^2}{\sigma_k^2}\right) \qquad [\text{Eqn. 14}]$$

$$= \sum_{m=1}^{M} \log_2\left(1 + \frac{\lambda_{k,m}^2 P_{k,m}}{\sigma_k^2}\right)$$

where $r_k$ is a transmission rate of a terminal k, $\Sigma_k$ is a diagonalized channel matrix of a terminal k, $P_k$ is a transmission power matrix for a terminal k, $\sigma_k^2$ is noise power experienced by a terminal k, M is the number of reception antennas of a terminal, $\lambda_{k,m}$ is an effective channel gain for an m-th stream of a terminal k, and $p_{k,m}$ is transmission power for an m-th stream of a terminal k.

In addition, limit transmission power of each base station is given by Equation 15:

$$\sum_{k=1}^{K} \sum_{m=1}^{M} p_{k,m} tr(v_{k,m,n} v_{k,m,n}^H) \leq P_{max}, n = 1, \ldots, N \qquad [\text{Eqn. 15}]$$

$$v_{k,m} = [v_{k,m,1}^T, \ldots v_{k,m,N}^T]^T, v_{k,m,n} \in C^{L \times 1}$$

where K is the number of multiple accessing terminals, M is the number of reception antennas of a terminal, $p_{k,m}$ is transmission power for an m-th stream of a terminal k, $v_{k,m,n}$ is an n-th element of a beamforming vector for an m-th stream of a terminal k, $tr(v_{k,m,n} v_{k,m,n}^H)$ is a power gain for a base station n due to beamforming of an m-th data stream of a terminal k, $P_{max}$ is limit transmission power of each base station, N is the number of base stations participating in cooperative transmission, and $v_{k,m}$ is a beamforming vector for an m-th stream of a terminal k.

When power allocation values for each data stream of respective terminals are the same, a power value derived from Equation 15 becomes Equation 16:

$$\bar{p} = \frac{P_{max}}{\max_n \sum_{k=1}^{K} \sum_{m=1}^{M} tr(v_{k,m,n} v_{k,m,n}^H)} \qquad [\text{Eqn. 16}]$$

where $\bar{p}$ is power allocated to each terminal, $P_{max}$ is limit transmission power of each base station, K is the number of multiple accessing terminals, M is the number of reception antennas of a terminal, $v_{k,m,n}$ is an n-th element of a beamforming vector for an m-th stream of a terminal k, and $tr(v_{k,m,n}v_{k,m,n}^H)$ is a power gain for a base station n due to beamforming of an m-th data stream of a terminal k.

In this case, a power allocation problem is expressed by Equation 17:

$$\max \sum_{k=1}^{K} \sum_{m=1}^{M} \log_2\left(1 + \frac{\lambda_{k,m}^2 P_{k,m}}{\sigma_k^2}\right) \quad [\text{Eqn. 17}]$$

$$\text{s.t.} \sum_{k=1}^{K} \sum_{m=1}^{M} p_{k,m} tr(v_{k,m,n} v_{k,m,n}^H) \leq P_{max}, n = 1, \ldots, N$$

$$\sum_{m=1}^{M} \log_2\left(1 + \frac{\lambda_{k,m}^2 P_{k,m}}{\sigma_k^2}\right) \geq r_k^{min}, k = 1, \ldots, K$$

where K is the number of multiple accessing terminals, M is the number of reception antennas of a terminal, $\lambda_{k,m}$ is an effective channel gain for an m-th stream of a terminal k, $p_{k,m}$ is transmission power for an m-th stream of a terminal k, $\sigma_k^2$ is noise power experienced by a terminal k, $v_{k,m,n}$ is an n-th element of a beamforming vector for an m-th stream of a terminal k, $tr(v_{k,m,n}v_{k,m,n}^H)$ is a power gain for a base station n due to beamforming of an m-th data stream of a terminal k, $P_{max}$ is limit transmission power of each base station, N is the number of base stations participating in cooperative transmission, and $r_k^{min}$ is a minimum transmission rate for a terminal k.

Since forms of an object function and a constraint condition in an optimization problem shown in Equation 17 are convex functions, a local optimum value is a global optimum value. However, since a constraint condition for a minimum transmission rate included in Equation 17 is non-linear, it is not easy to determine whether a solution exists. Therefore, an exemplary embodiment of the present invention proposes an alternative for easily determining whether the solution exists by transforming the constraint condition for the minimum transmission rate into a linear constraint condition.

A transmission rate of each terminal is determined by a power set to be allocated to data streams. Therefore, a constraint condition for a minimum transmission rate of each terminal may be transformed into a constraint condition for powers of the data streams. In this case, K non-linear constraint conditions for a minimum transmission rate included in Equation 17 become KM linear constraint conditions. Each linear constraint condition is that a power value to be allocated to each data stream should be greater than a threshold. Here, the threshold is determined through an optimization problem for determining minimum power meeting a constraint condition for the minimum transmission rate. An optimization problem for determining minimum power to be allocated to the data streams is given by Equation 18:

$$\min_{p_{k,m}} q_k \quad [\text{Eqn. 18}]$$

$$\text{s.t.} \sum_{m=1}^{M} p_{k,m} tr(v_{k,m,n} v_{k,m,n}^H) \leq q_k, n = 1, \ldots, N$$

$$\sum_{m=1}^{M} \log_2\left(1 + \frac{\lambda_{k,m}^2 P_{k,m}}{\sigma_k^2}\right) \geq r_k^{min}$$

where $p_{k,m}$ is transmission power for an m-th stream of a terminal k, $q_k$ is power per base station for satisfying a minimum transmission rate of a terminal k, M is the number of reception antennas of a terminal, $v_{k,m,n}$ is an n-th element of a beamforming vector for an m-th stream of a terminal k, $tr(v_{k,m,n}v_{k,m,n}^H)$ is a power gain for a base station n due to beamforming of an m-th data stream of a terminal k, $\lambda_{k,m}$ is an effective channel gain for an m-th stream of a terminal k, $\sigma_k^2$ is noise power experienced by a terminal k, and $r_k^{min}$ is a minimum transmission rate for a terminal k.

Power values to be allocated to the data streams are limited by limit power of each base station. Therefore, a first constraint condition included in Equation 18, that is, a constraint condition for power per base station for satisfying a minimum transmission rate of a terminal k denotes that required power of each base station for meeting a second constraint condition included in Equation 18, that is, a constraint condition for a minimum transmission rate of a terminal k is equal to or smaller than a power value allocated to the terminal k. When the power value allocated to the terminal k is an optimum value and is a constraint condition for limit transmission power of a base station, the left side value of the constraint condition for the minimum transmission rate included in Equation 18, that is, an optimum value that maximizes a data transmission rate is equal to a minimum transmission rate of the terminal k. An optimization problem of Equation 18 is changed into Equation 19 using a KKT condition equation.

$$p_{k,m} = \left[\frac{1}{\ln 2} \frac{\mu}{\sum_{n=1}^{N} V_n tr(v_{k,m,n} v_{k,m,n}^H)} - \frac{\sigma_k^2}{\lambda_{k,m}^2}\right]^+ \quad [\text{Eqn. 19}]$$

$$\sum_{m=1}^{M} p_{k,m} tr(v_{k,m,n} v_{k,m,n}^H) \leq q_k, n = 1, \ldots, N$$

$$\sum_{m=1}^{M} \log_2\left(1 + \frac{\lambda_{k,m}^2 P_{k,m}}{\sigma_k^2}\right) \geq r_k^{min}$$

where $p_{k,m}$ is transmission power for an m-th stream of a terminal k, $\mu$ is the second constraint condition of Equation 18, that is, a Lagrangian multiplier for a constraint condition for a minimum transmission rate of a terminal, N is the number of base stations participating in cooperative transmission, $v_n$ is a Lagrangian multiplier for a constraint condition for the first constraint condition of Equation 18, that is, for a constraint condition for power per base station for satisfying a minimum transmission rate of a terminal, $v_{k,m,n}$ is an n-th element of a beamforming vector for an m-th stream of a terminal k, $tr(v_{k,m,n}v_{k,m,n}^H)$ is a power gain for a base station n due to beamforming of an m-th data stream of a terminal k, $\sigma_k^2$ is noise power experienced by a terminal k, $\lambda_{k,m}$ is an effective channel gain for an m-th stream of a terminal k, M is the number of reception antennas of a terminal, $q_k$ is power per base station for satisfying a minimum transmission rate of a terminal k, and $r_k^{min}$ is a minimum transmission rate for a terminal k.

An algorithm for determining an optimum power value of each terminal described using Equation 19 may be summarized in Table 2.

TABLE 2

| Step 0 | Temporarily determine a medium value of a maximum value and a minimum value of power per base station for satisfying a minimum transmission rate for each terminal. |
|---|---|
| | $q_k \leftarrow \dfrac{q_k^{min} + q_k^{max}}{2}$ |
| Step 1 | Determine an optimum power value with consideration of constraint condition for $q_k$. |
| | $p_{k,m}^{min} = \left[ \dfrac{1}{\ln 2} \dfrac{1}{\sum_{n=1}^{N} V_n tr(v_{k,m,n} v_{k,m,n}^H)} - \dfrac{\sigma_k^2}{\lambda_{k,m}^2} \right]^+$ |
| Step 2 | Determine an optimum transmission rate with consideration of $p_{k,m}^{min}$. |
| | $r_k^{opt} = \sum_{m=1}^{M} \log_2 \left( 1 + \dfrac{\lambda_{k,m}^2 P_{k,m}^{min}}{\sigma_k^2} \right)$ |
| Step 3 | Update the maximum value and the minimum value of power per base station for satisfying the minimum transmission rate for each terminal. |
| | $q_k^{min} \leftarrow q_k$, if $r_k^{opt} \leq r_k^{min}$. |
| | $q_k^{max} \leftarrow q_k$, otherwise |
| Step 4 | If a difference between the maximum value and the minimum value is less than a threshold, finish the procedure. |
| | Else, proceed Step 0. |

In Table 2, $q_k$ is power per base station for satisfying a minimum transmission rate of a terminal k, $q_k^{min}$ is a minimum value of power per base station for satisfying a minimum transmission rate of a terminal k, $q_k^{max}$ is a maximum value of power per base station for satisfying a minimum transmission rate of a terminal k, $p_{k,m}^{min}$ is minimum power for satisfying a minimum transmission rate of an m-th stream of a terminal k, N is the number of base stations participating in cooperative transmission, $v_n$ is a Lagrangian multiplier for a constraint condition for the first constraint condition of Equation 19, that is, for a constraint condition for power allocated to a terminal, $v_{k,m,n}$ is an n-th element of a beamforming vector for an m-th stream of a terminal k, $tr(v_{k,m,n} v_{k,m,n}^H)$ is a power gain for a base station n due to beamforming of an m-th data stream of a terminal k, $\sigma_k^2$ is noise power experienced by a terminal k, $\lambda_{k,m}$ is an effective channel gain for an m-th stream of a terminal k, $r_k^{opt}$ is an optimum transmission rate for a terminal k, and M is the number of reception antennas of a terminal.

A non-linear constraint condition for the minimum transmission rate included in Equation 17 is made linear using optimum power values for respective terminals determined as described above. That is, minimum transmission power values that meet a minimum transmission rate of a constraint condition for the minimum transmission rate are values that satisfy a given minimum transmission rate, while simultaneously, values that minimize power to be allocated by each base station. Therefore, a non-linear constraint condition for the minimum transmission rate included in Equation 17 is made linear as in Equation 20:

$$\sum_{m=1}^{M} \log_2 \left( 1 + \dfrac{\lambda_{k,m}^2 P_{k,m}}{\sigma_k^2} \right) \geq r_k^{min} \Leftrightarrow p_{k,m} \geq p_{k,m}^{min}, \quad [\text{Eqn. 20}]$$

$$m = 1, \ldots, M$$

where M is the number of reception antennas of a terminal, $\lambda_{k,m}$ is an effective channel gain for an m-th stream of a terminal k, $p_{k,m}$ is transmission power for an m-th stream of a terminal k, $\sigma_k^2$ is noise power experienced by a terminal k, $r_k^{min}$ is a minimum transmission rate for a terminal k, and $p_k^{min}$ is minimum power for satisfying a minimum transmission rate.

A power allocation problem of Equation 17 may be changed into Equation 21 by applying Equation 20.

$$\max_{P_{k,m}} \sum_{k=1}^{K} \sum_{m=1}^{M} \log_2 \left( 1 + \dfrac{\lambda_{k,m}^2 P_{k,m}}{\sigma_k^2} \right) \quad [\text{Eqn. 21}]$$

$$\text{s.t.} \sum_{k=1}^{K} \sum_{m=1}^{M} p_{k,m} tr(v_{k,m,n} v_{k,m,n}^H) \leq P_{max},$$

$$n = 1, \ldots, N$$

$$p_{k,m} \geq p_{k,m}^{min}, m = 1, \ldots, M, k = 1, \ldots, K$$

where K is the number of multiple accessing terminals, M is the number of reception antennas of a terminal, $\lambda_{k,m}$ is an effective channel gain for an m-th stream of a terminal k, $p_{k,m}$ is transmission power for an m-th stream of a terminal k, $\sigma_k^2$ is noise power experienced by a terminal k, $v_{k,m,n}$ is an n-th element of a beamforming vector for an m-th stream of a terminal k, $tr(v_{k,m,n} v_{k,m,n}^H)$ is a power gain for a base station n due to beamforming of an m-th data stream of a terminal k, $P_{max}$ is limit transmission power of each base station, and $p_k^{min}$ is minimum power for satisfying a minimum transmission rate.

At this point, a range where a solution exists is determined by two constraint conditions included in Equation 21. More particularly, in the case where minimum transmission powers allocated to a data stream meet a constraint condition for limit transmission power of a base station in Equation 21, a solution of the power allocation problem exists. When the solution exists, a power allocation problem of Equation 21 may be changed into Equation 22 using a KKT condition equation.

$$p_{k,m} = \left[ \dfrac{1}{\ln 2} \dfrac{1}{\sum_{n=1}^{N} V_n tr(v_{k,m,n} v_{k,m,n}^H)} - \dfrac{\sigma_k^2}{\lambda_{k,m}^2} \right]^+, \quad [\text{Eqn. 22}]$$

$$p_{k,m}^* = \max(p_{k,m}, p_{k,m}^{min})$$

$$\sum_{k=1}^{K} \sum_{m=1}^{M} p_{k,m} tr(v_{k,m,n} v_{k,m,n}^H) \leq P_{max}, n = 1, \ldots, N$$

where $p_{k,m}$ is transmission power for an m-th stream of a terminal k, N is the number of base stations participating in cooperative transmission, $v_n$ is a Lagrangian multiplier for a first constraint condition shown in Equation 21, that is, a constraint condition for limit transmission power of a base station, $v_{k,m,n}$ is an n-th element of a beamforming vector for an m-th stream of a terminal k, $tr(v_{k,m,n} v_{k,m,n}^H)$ is a power gain for a base station n due to beamforming of an m-th data stream of a terminal k, $\sigma_k^2$ is noise power experienced by a terminal k, $\lambda_{k,m}$ is an effective channel gain for an m-th stream of a terminal k, $p_{k,m}^*$ is a larger value of a power value for the m-th stream of the terminal k and a minimum power value for each stream and is a power value finally allocated to an m-th stream of a terminal k, K is the number of multiple accessing terminals, M is the number of reception antennas of a terminal, and $P_{max}$ is limit transmission power of each base station.

An optimum solution for the power allocation problem may be determined through a power control algorithm proposed for the case that employs a single reception antenna. At this point, whether the solution exists may be determined through a constraint condition for limit transmission power of a base station in Equation 21 is met using minimum power values of Equation 20. When the solution does not exist, a situation where the solution exists is formed by relieving constraint conditions, that is, removing at least one of K terminals which are multiple access objects, similarly to the case that employs the single reception antenna. At this point, the removing of a terminal is performed by Equation 23:

$$k^* = \arg\max_k q_k \quad \text{[Eqn. 23]}$$

where k* is an index of a terminal to be removed, k is an index of a terminal, and $q_k$ is power per base station for satisfying a minimum transmission rate of a terminal k.

When a terminal that is allocated largest power is removed as in Equation 23, there is high possibility that a minimum transmission rate of the other terminals is achieved. In addition, when minimum transmission rates required for each terminal are the same, a process of Equation 23 is a process where a terminal having a relatively poor channel state is removed.

In the case where a multiple reception antenna is employed, a power control algorithm for satisfying a minimum transmission rate and maximizing a system transmission rate, and a terminal removing algorithm may be summarized in Table 3. The algorithm shown in Table 3 regards all base stations participating in cooperative transmission as one entity.

TABLE 3

| | |
|---|---|
| Step 0 | Deterime a set of multiple accessing terminals and data stream sets of terminals.<br>S = {1, 2, . . . , K}<br>$T_k$ = {1, 2, . . . , M} |
| Step 1 | Determine beamforming vectors and a set of minimum powers for satisfying a minimum transmission rate of terminals.<br>P = {$p^{min}_{k,m}$\|k ∈ S, m ∈ $T_k$} |
| Step 2 | Determine whether a solution exists.<br>$$\sum_{k=1}^{K}\sum_{m=1}^{M} P^{min}_{k,m} tr(v_{k,m,n} v_{k,m,n}^H) \leq P_{max}, n = 1, \ldots N$$<br>If above equation is met, proceed step 3.<br>Else, update the set of multiple accessing terminals accorindg to Equation 23, and proceed step 1. |
| Step 3 | Perform a power control according to Equation 22<br>If a constraint condition is not met, update the set of multiple accessing terminals, and proceed step 1. |

In Table 3, S is a set of multiple accessing terminals, K is the number of multiple accessing terminals, $T_k$ is a data stream set of a terminal k, M is the number of reception antennas of a terminal, P is a set of minimum powers for satisfying a minimum transmission rate of terminals, and $p_k^{min}$ is minimum power for satisfying a minimum transmission rate.

When power values of the same size are allocated to each terminal, a possible alternative for satisfying a minimum transmission rate of each terminal is to control multiple accessing terminals. In this case, terminals are managed as follows.

As described in the description of the case of employing the single reception antenna, since selection and removal of a terminal has a characteristic of a combination problem, selection of an optimum terminal requires a high complexity of operation. Therefore, an exemplary embodiment of the present invention proposes a terminal removing alternative having a low complexity of operation. A terminal removal method according to an exemplary embodiment of the present invention finds out a terminal set meeting a minimum transmission rate by removing terminals one by one, step by step from already selected terminals. A primary terminal removal is performed using a transmission rate as in Equation 24:

$$k^* = \arg\min_k r_k \quad \text{[Eqn. 24]}$$

where k* is an index of a terminal to be removed, k is an index of a terminal, and $r_k$ is a transmission rate of a terminal k.

Since a low transmission rate of a terminal denotes that the terminal has a low effective channel gain or a low SINR, a whole effective channel gain for a terminal set increases by removing the terminal. Accordingly, when new beamforming is performed on the terminal set from which the terminal has been removed, a possibility that a minimum transmission rate is met increases. A terminal set management algorithm using Equation 24 is summarized in Table 4.

TABLE 4

| | |
|---|---|
| Step 0 | Deterime a set of multiple accessing terminals.<br>S = {1, 2, . . . , K} |
| Step 1 | Determine<br>$$\bar{p} = \frac{P_{max}}{\max_n \sum_{k \in S}\sum_{m=1}^{M} tr(v_{k,m,n} v_{k,m,n}^H)}$$ |
| Step 2 | Determine a transmission rate of the set of terminals and select a terminal with a worst transmission rate.<br>$$r_k = \sum_{m=1}^{M} \log_2\left(1 + \frac{\lambda_{k,m}^2 \bar{p}}{\sigma_k^2}\right)$$<br>$$k^* = \arg\min_k r_k$$ |
| Step 3 | If transmission rate of all terminals are greater than a minimum transmission rate, finish this procedure.<br>Else, proceed Step 4. |
| Step 4 | Remove the terminal with a worst transmission rate in the set, and proceed Step 1.<br>$S_k \leftarrow S_k - k^*$ |

In Table 4, S is a set of multiple accessing terminals, K is the number of multiple accessing terminals, $\bar{p}$ is power allocated to each terminal, $P_{max}$ is limit transmission power of each terminal, M is the number of reception antennas of a terminal, $v_{k,m,n}$ is an n-th element of a beamforming vector for an m-th stream of a terminal k, $tr(v_{k,m,n} v_{k,m,n})$ is a power gain for a base station n due to beamforming of an m-th data stream of a terminal k, $r_k$ is a transmission rate of a terminal k, $\lambda_{k,m}$ is an effective channel gain for an m-th stream of a terminal k, $\sigma_k^2$ is noise power experienced by a terminal k, and k* is an index of a terminal having a worst transmission rate.

Hereinafter, an operation and a construction of a base station performing a power control are described in more detail with reference to drawings.

Figure 2:
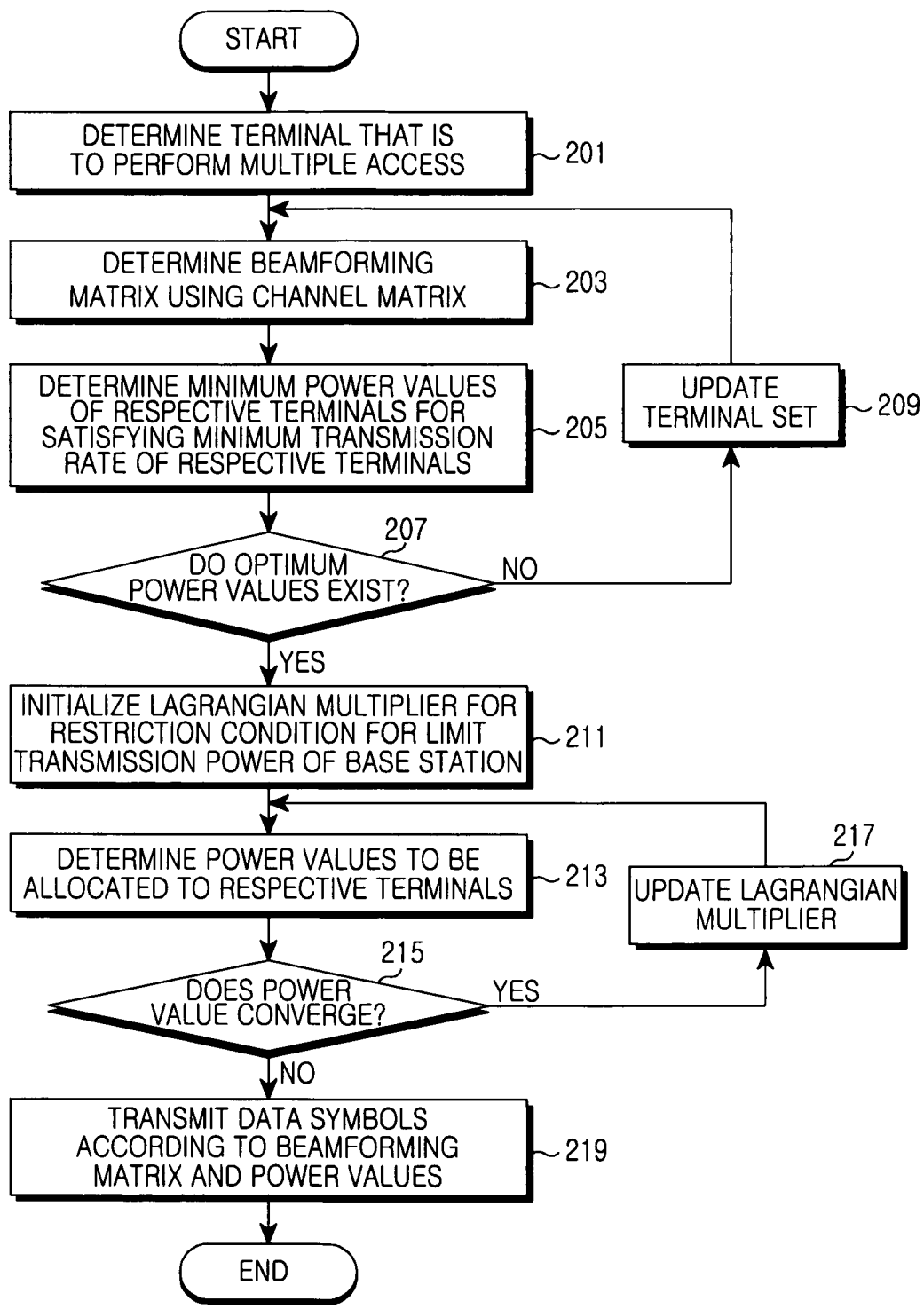
FIG. 2 illustrates an operation of a base station in a distributed MIMO wireless communication system according to an exemplary embodiment of the present invention.

FIG. 2 illustrates an operation procedure of a base station in a distributed MIMO wireless communication system according to an exemplary embodiment of the present invention. FIG. 2 illustrates a power control procedure for the case where the number of antennas per sector of a base station and the number of reception antennas of a terminal are 1, respectively.

Referring to FIG. 2, the base station determines a terminal set for a multiple access in step 201. In other words, the base station determines terminals that are to simultaneously receive signals through a multiple access. At this point, the base station shares the terminal set with other base stations participating in cooperative transmission. Therefore, the base station performs communication with the other base stations via a backhaul network, and shares information regarding the terminal set.

After determining the terminal set, the base station determines a beamforming matrix using a channel matrix between terminals included in the terminal set and base stations participating in the cooperative transmission in step 203. For example, the beamforming matrix is a ZF beamforming matrix. In this case, the base station determines the beamforming matrix by determining an inverse matrix of the channel matrix. Here, the base station does not use all of the beamforming matrix, but the base stations participating in the cooperative transmission divide and use the beamforming matrix on a column basis. That is, the base station uses one column of the beamforming matrix as a beamforming vector.

After determining the beamforming matrix, the base station determines minimum power values, that is, a minimum power set of the respective terminals for satisfying a minimum transmission rate of each terminal included in the terminal set in step 205. In other words, the base station determines the minimum power set using the minimum transmission rate of each terminal and the noise power experienced by each terminal. For example, the base station determines minimum power values of the respective terminals using Equation 7.

After determining the minimum power values, the base station determines whether optimum power values for the respective terminals exist in step 207. That is, the base station determines whether a solution of a power optimization problem exists. At this point, the base station determines whether the optimum power values exist using minimum power values of the respective terminals, the beamforming matrix, and limit transmission power of the base station. That is, the base station determines sum of transmission powers with consideration of a power gain through the beamforming matrix, and then determines whether the sum of the transmission powers exceeds the limit transmission power of the base station. For example, the base station determines whether a constraint condition included in step 2 of Table 2 is met.

When the optimum power values do not exist, the base station updates the terminal set in step 209, and returns to step 203. At this point, the terminal set is updated by removing one terminal. That is, the base station removes a terminal having a largest minimum power value, or removes a terminal having a largest power gain through the beamforming. For example, the base station selects a terminal to be removed using Equation 10 or 11. At this point, like step 201, since information regarding the terminal set is to be shared with other base stations participating in the cooperative transmission, the base station transmits/receives information regarding the terminal to be removed via a backhaul network.

In contrast, when optimum power values exist, the base station initializes a Lagrangian multiplier for a constraint condition for limit transmission power of the base station in step 211. Here, the Lagrangian multiplier is for determining an optimization equation including the constraint condition in order to facilitate solving an optimization problem having a constraint condition. Since calculation of the Lagrangian multiplier is a widely known mathematical operation, description thereof is omitted.

After initializing the Lagrangian multiplier, the base station determines power values to be allocated to the respective terminals in step 213. That is, the base station determines a temporary power value using the Lagrangian multiplier, an element of a beamforming vector corresponding to a terminal k, and noise power experienced by the terminal k, and determines a larger one of the temporary power value and a minimum power value as a power value of the terminal k. That is, the base station performs the power value determination process on each terminal. For example, the base station determines power values to be allocated to the respective terminals using Equation 8.

The base station determines whether the power values converge in step 215. Here, whether the power values converge is determined depending on whether a difference between a power value re-determined by repeated update of the Lagrangian multiplier and a previous power value is smaller than a threshold. That is, the base station determines a difference value between a power value of a previous repetition step and a power value of a current repetition step, and then determines whether the difference value is smaller than the threshold. At this point, when a power value calculation process is not performed two or more times, the difference value cannot be determined and the base station determines the power values do not converge.

When the power values do not converge, in other words, when the difference value is greater than the threshold, the base station updates the Lagrangian multiplier in step 217. At this point, the base station updates the Lagrangian multiplier using a current Lagrangian multiplier, elements of the beamforming vector, and current power values of the respective terminals. For example, the base station updates the Lagrangian multiplier using Equation 9. After that, the base station returns to step 213.

In contrast, when the power values converge, the base station completes power allocation and transmits data symbols according to the beamforming matrix and the power values in step 219. In other words, the base station multiplies data symbols to the respective terminals by the power values and a column vector of the beamforming matrix that corresponds to the base station, up-converts the multiplied data symbols into a Radio Frequency (RF) signal, and then transmits the RF signal via an antenna.

Figure 3:
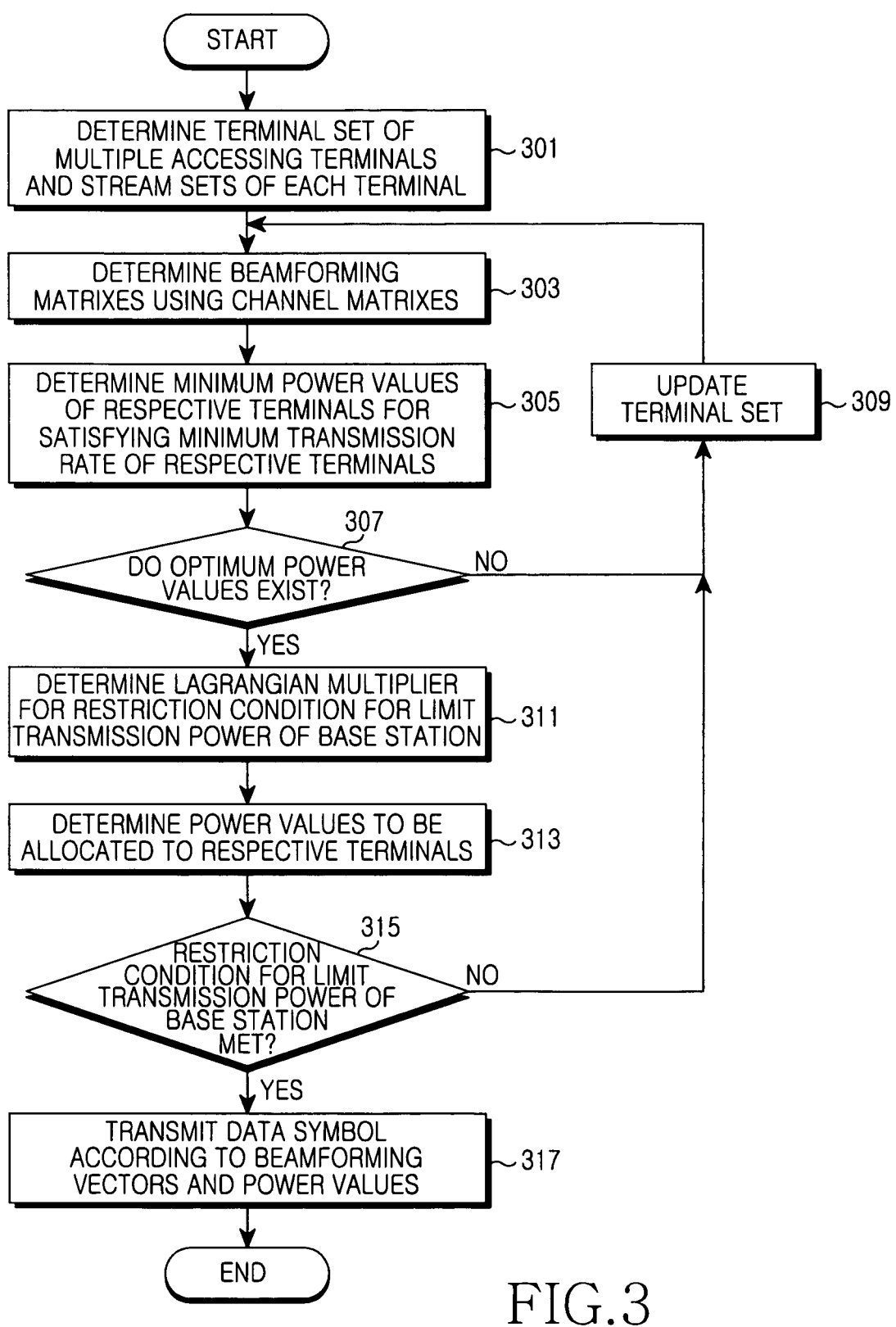
FIG. 3 illustrates an operation of a base station in a distributed MIMO wireless communication system according to an exemplary embodiment of the present invention.

FIG. 3 illustrates an operation procedure of a base station in a distributed MIMO wireless communication system according to an exemplary embodiment of the present invention. FIG. 3 illustrates a power control procedure for the case where a base station has a plurality of antennas per sector and a terminal has a plurality of reception antennas.

Referring to FIG. 3, the base station determines a terminal set for a multiple access, and stream sets in step 301. In other words, the base station determines terminals that are to simultaneously receive signals through a multiple access, and streams of respective terminals. At this point, the base station shares the terminal set and the stream sets with other base stations participating in cooperative transmission. Therefore, the base station communicates with the other base stations and shares information regarding the terminal set and the stream sets via a backhaul network.

After determining the terminal set and the stream sets, the base station determines beamforming matrixes using channel matrixes between terminals included in the terminal set and base stations participating in the cooperative transmission in step 303. For example, the beamforming matrix is determined through a BD operation. Here, the base station does not use all of the beamforming matrix, but the base stations participating in the cooperative transmission divide and use the beamforming matrix on a column basis. That is, the base station uses columns corresponding to transmission antennas of the base station of the beamforming matrix as a beamforming matrix.

After determining the beamforming matrixes, the base station determines minimum power values for each stream of respective terminals, that is, a minimum power set for satisfying a minimum transmission rate of the respective terminals included in the terminal set in step 305. Here, the minimum power values are determined for each stream, and accordingly, each terminal has minimum power values as many as the number of streams of the terminal. At this point, the base station determines the minimum power set using power to be allocated by each base station to satisfy a minimum transmission rate of a terminal, a power gain for each stream of each terminal due to beamforming, noise power experienced by each terminal, and an effective channel gain of each terminal.

At this point, the base station controls power that each base station allocates in order to satisfy a minimum transmission rate of a terminal, and determines optimum minimum power values. For example, the base station determines optimum power values as in Table 2. Detailed description is made with consideration of a terminal k. The base station initializes power that each base station allocates in order to satisfy a minimum transmission rate of a terminal k in step 0. The base station determines a Lagrangian multiplier for a constraint condition for the initialized power that each base station allocates in order to satisfy a minimum transmission rate of a terminal k, and then determines minimum power values for each stream using the Lagrangian multiplier, the power gain for each stream of each terminal due to beamforming, noise power experienced by the terminal k, and an effective channel gain of the terminal k in step "1." The base station determines an optimum transmission rate using the minimum power values, the effective channel gain of the terminal k, and the noise power experienced by the terminal k in step 2, and updates a minimum value and a maximum value of power to be allocated to satisfy the minimum transmission rate of the terminal k according to the optimum transmission rate and the minimum transmission rate in step 3. At this point, when a difference value between the optimum transmission rate and the minimum transmission rate is equal to or greater than a threshold, the base station re-determines the minimum power values by repeating the above-described process.

After determining the minimum power values, the base station determines whether optimum power values for the respective terminals exist in step 307. That is, the base station determines whether a solution of a power optimization problem exists. At this point, the base station determines whether the optimum power values exist using the minimum power values for each stream of the respective terminals, the beamforming matrixes, and limit transmission power of the base station. That is, the base station determines a transmission power sum for the case where the minimum power values have been applied with consideration of a power gain through the beamforming matrixes, and then determines whether the transmission power sum exceeds limit transmission power of the base station. For example, the base station determines whether a constraint condition included in step 2 of Table 3 is met.

When the optimum power values do not exist, the base station updates the terminal set in step 309, and returns to step 303. At this point, the terminal set is updated by removing one terminal. For example, the base station selects a terminal having maximum power to be allocated by each base station to satisfy a minimum transmission rate of a terminal, as a terminal to be removed as in Equation 23. At this point, like step 301, since the terminal set is to be shared with other base stations participating in the cooperative transmission, the base station transmits/receives information regarding a terminal to be removed via a backhaul network.

In contrast, when the optimum power values exist, the base station determines a Lagrangian multiplier for a constraint condition for limit transmission power of the base station, that is, a first constraint condition of Equation 21 in step 311. Here, the Lagrangian multiplier is for determining an optimization equation including the constraint condition in order to facilitate solving an optimization problem having a constraint condition. Since calculation of the Lagrangian multiplier is a widely known mathematical operation, description thereof is omitted.

After determining the Lagrangian multiplier, the base station determines power values to be allocated to the respective terminals in step 313. That is, the base station determines a temporary power value using the Lagrangian multiplier, a power gain of an m-th stream of the terminal k due to beamforming, noise power experienced by the terminal k, and an effective channel gain of the m-th stream of the terminal k, and determines a larger one of the temporary power value and the minimum power value as a power value of the m-th stream of the terminal k. That is, the base station performs the power value determination process on each stream of each terminal. For example, the base station determines power values to be allocated to the respective terminals using Equation 22.

The base station determines whether the power values meet a constraint condition for limit transmission power of the base station in step 315. At this point, the base station determines whether the optimum power values exist using minimum power values for each stream of the respective terminals, the beamforming matrixes, and the limit transmission power of the base station. That is, the base station determines a transmission power sum to the respective terminals with consideration of a power gain through the beamforming matrixes, and then determines whether the transmission power sum exceeds the limit transmission power of the base station. For example, the base station determines whether a constraint condition of Equation 22 is met. When the power values do not meet the constraint condition for the limit transmission power of the base station, the base station updates the terminal set in step 309, and returns to step 303.

In contrast, when the power values meet the constraint condition for the limit transmission power of the base station, the base station completes power allocation and transmits data symbols according to the beamforming matrixes and the power values in step 317. In other words, the base station multiplies the data symbols to the respective terminals by the power values and column vectors of the beamforming matrix that correspond to the base station, up-converts the multiplied data symbols into an RF signal, and transmits the signal via an antenna.

Figure 4:
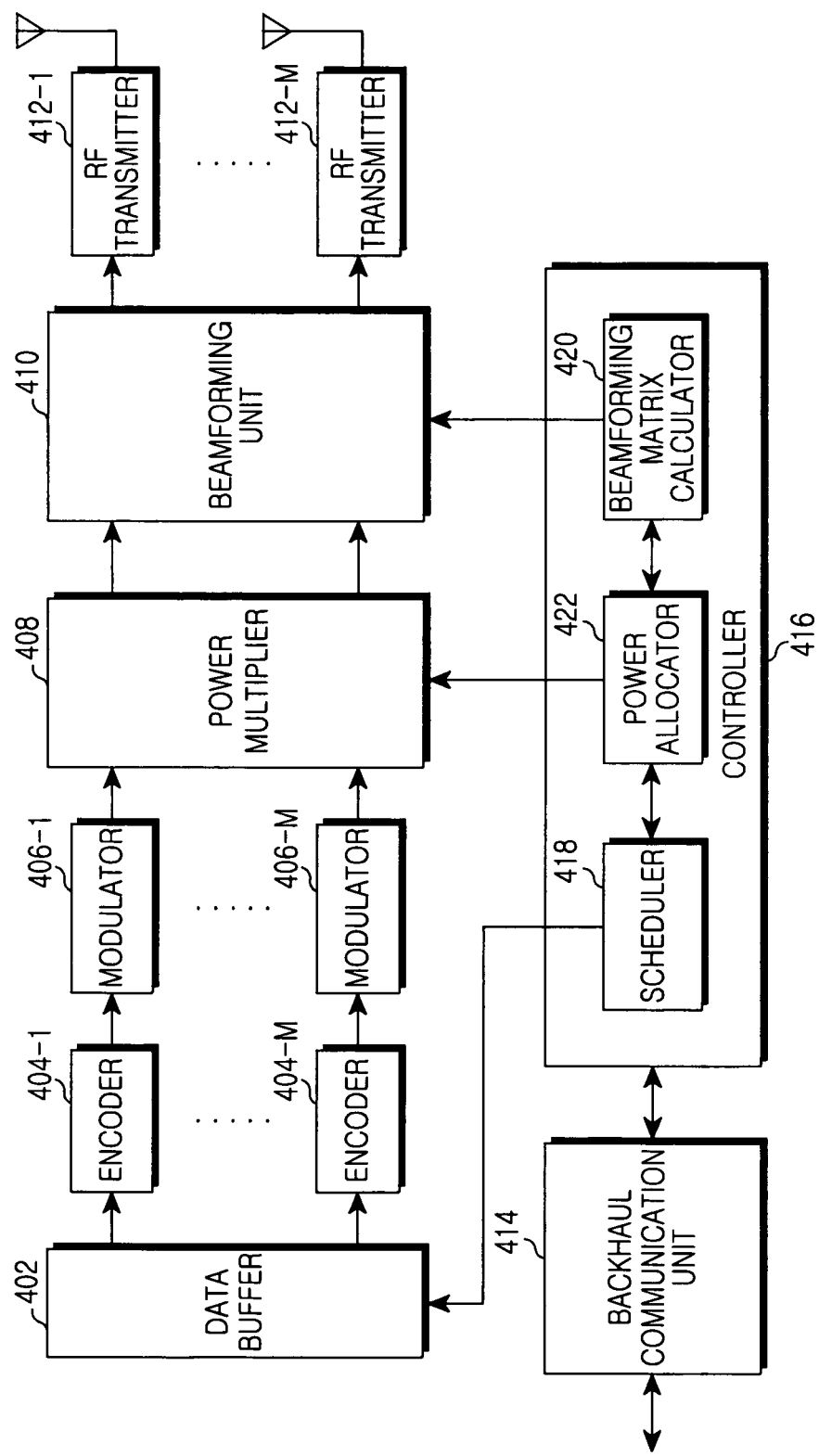
FIG. 4 illustrates a base station in a distributed MIMO wireless communication system according to an exemplary embodiment of the present invention.

FIG. 4 illustrates a base station in a distributed MIMO wireless communication system according to an exemplary embodiment of the present invention.

The base station includes a data buffer 402, a plurality of encoders 404-1 to 404-L, a plurality of modulators 406-1 to 406-L, a power multiplier 408, a beamforming unit 410, a plurality of RF transmitters 412-1 to 412-L, a backhaul communication unit 414, and a controller 416.

The data buffer 402 stores data to be transmitted to terminals, and outputs the stored data under control of the controller 416. The plurality of encoders 404-1 to 404-L channel-encode a data bit line provided from the data buffer 402. The plurality of modulators 406-1 to 406-L generate complex symbols for each stream by modulating channel-encoded bit lines.

The power multiplier 408 applies power values provided from the controller 416 to transmission symbols. That is, the power multiplier 408 receives power values of respective terminals from the controller 416, and multiplies transmission symbols of the respective terminals by corresponding power values. The beamforming unit 410 performs beamforming using a beamforming vector or a beamforming matrix provided from the controller 416. That is, the beamforming unit 410 receives the beamforming vector or the beamforming matrix from the controller 416, and multiplies the transmission symbols of the respective terminals by a corresponding element of the beamforming vector or the beamforming matrix. The plurality of RF transmitters 412-1 to 412-L up-convert beamformed transmission signals into RF signals, and then transmit the signals via a plurality of transmission antennas.

The backhaul communication unit 414 provides an interface for communication with other base stations participating in cooperative transmission. More particularly, to share a terminal set including multiple accessing terminals, the backhaul communication unit 414 transmits/receives information for sharing the terminal set with the base station participating in the cooperative transmission via a backhaul network. The controller 416 controls an overall function of the base station. The controller 416 includes a scheduler 418, a beamforming matrix calculator 420, and a power allocator 422. The scheduler 418 determines terminals for a multiple access, and allocates a resource to the terminals. The beamforming matrix calculator 420 determines a beamforming matrix for processing transmission signals to the terminals. The power allocator 422 determines transmission power values for the terminals within limit transmission power. Detailed operations of the scheduler 418, the beamforming matrix calculator 420, and the power allocator 422 change depending on an exemplary embodiment of the present invention, and operations according to each embodiment is described below.

According to an exemplary embodiment of the present invention, the scheduler 418 determines a terminal set of multiple accessing terminals, and provides the terminal set information to the beamforming matrix calculator 420. Accordingly, the beamforming matrix calculator 420 determines a beamforming matrix using a channel matrix between terminals included in the terminal set and base stations participating in the cooperative transmission. For example, the beamforming matrix is a ZF beamforming matrix. In this case, the beamforming matrix calculator 420 determines the beamforming matrix by determining an inverse matrix of the channel matrix. In addition, the beamforming matrix calculator 420 provides the beamforming matrix information to the power allocator 422. Subsequently, the power allocator 422 determines power values for the terminals. More particularly, the power allocator 422 determines minimum power values, that is, a minimum power set for satisfying a minimum transmission rate of respective terminals included in the terminal set, and determines whether optimum power values exist using the minimum power values. That is, the power allocator 422 determines a transmission power sum with consideration of a power gain through the beamforming matrix, and determines whether the transmission power sum exceeds limit transmission power of the power allocator 422. When the optimum power values do not exist, the power allocator 422 informs the scheduler 418 that optimum power values do not exist, and the scheduler 418 updates the terminal set by removing a terminal having a largest minimum power value, or removing a terminal having a largest power gain through the beamforming. Accordingly, the above-described process is repeated. In contrast, when the optimum power values exist, the power allocator 422 initializes a Lagrangian multiplier for a constraint condition for limit transmission power of the base station, and then determines power values to be allocated to the respective terminals as in Equation 8. At this point, the calculation of the power values is repeated until the power values converge. In every repetition step, the Lagrangian multiplier is updated as in Equation 9. When the power values converge, the scheduler 418 instructs the data buffer 402 to output transmission data to terminals included in a current terminal set, and the beamforming matrix calculator 420 provides a beamforming vector or a beamforming matrix to the beamforming unit 410, and the power allocator 422 provides power values to the power multiplier 408.

According to an exemplary embodiment of the present invention, the scheduler 418 determines a terminal set of multiple accessing terminals, and stream sets, and provides the terminal set information and the stream set information to the beamforming matrix calculator 420. Accordingly, the beamforming matrix calculator 420 determines beamforming matrixes using channel matrixes between terminals included in the terminal set and base stations participating in the cooperative transmission. For example, the beamforming matrix is determined through a BD operation. In addition, the beamforming matrix calculator 420 provides the beamforming matrix information to the power allocator 422. Subsequently, the power allocator 422 determines power values for each stream for the terminals. More particularly, the power allocator 422 determines minimum power values for each stream of respective terminals, that is, a minimum power set for satisfying a minimum transmission rate of the respective terminals included in the terminal set, and determines whether optimum power values exist using the minimum power values. That is, the power allocator 422 determines a transmission power sum for the case where the minimum power values have been applied with consideration of a power gain through the beamforming matrixes, and then determines whether the transmission power sum exceeds limit transmission power of the power allocator 422. When the optimum power values do not exist, the power allocator 422 informs the scheduler that the optimum power values do not exist, and the scheduler 418 updates the terminal set by removing a terminal selected through Equation (23). Accordingly, the above-described process is repeated. In contrast, when the optimum power values exist, the power allocator 422 determines a Lagrangian multiplier for a constraint condition for limit transmission power of the base station, that is, a first constraint condition of Equation 21, and then determines power values to be allocated to respective terminals as in Equation 22. In addition, the power allocator 422 determines whether the power values meet a constraint condition for limit transmission power of the base station, that is, a constraint condition of Equation 22. When the constraint condition is not met, the power allocator 422 informs the scheduler 418 that the constraint condition is not met, and the scheduler 418 updates the terminal set by removing a terminal selected through Equation 23. Accordingly, the above-described process is repeated. In contrast, when the optimum power values exist, the scheduler 418 instructs the data buffer 402 to output transmission data to terminals included in a current terminal set, and the beamforming matrix calculator 420 provides a beamforming vector or a beamforming matrix to the beamforming unit 410, and the power allocator 422 provides power values to the power multiplier 408.

Of operations according to an above exemplary embodiment, an operation of the power allocator 422 for determining the minimum power values is described below. The power allocator 422 controls power that each base station allocates in order to satisfy a minimum transmission rate of a terminal, and determines optimum minimum power values. Detailed description is made with consideration of a terminal k. The power allocator 422 initializes power that each base station allocates in order to satisfy a minimum transmission rate of a terminal k in step 0 of Table 2. The power allocator 422 determines a Lagrangian multiplier for a constraint condition for the initialized power that each base station allocates in order to satisfy a minimum transmission rate of a terminal k, and then determines minimum power values for each stream using the Lagrangian multiplier, the power gain for each stream of each terminal due to beamforming, noise power experienced by the terminal k, and an effective channel gain of the terminal k in step 1. The power allocator 422 determines an optimum transmission rate using the minimum power values, the effective channel gain of the terminal k, and the noise power experienced by the terminal k in step 2, and updates a minimum value and a maximum value of power to be allocated to satisfy the minimum transmission rate of the terminal k according to the optimum transmission rate and the minimum transmission rate in step 3. At this point, when a difference value between the optimum transmission rate and the minimum transmission rate is equal to or greater than a threshold, the power allocator 422 re-determines the minimum power values by repeating the above-described process.

Figure 5A:
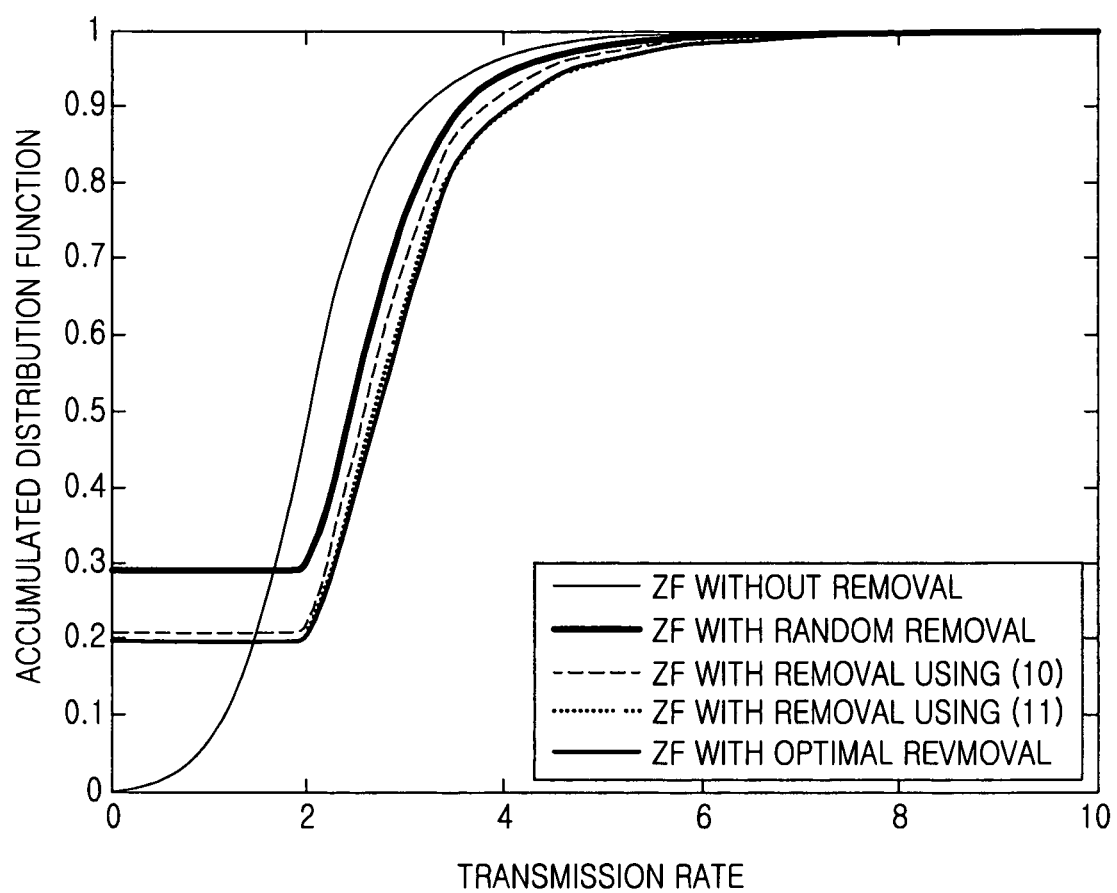
FIGS. 5A to 5C illustrate performance of a distributed MIMO wireless communication system according to an exemplary embodiment of the present invention.
Figure 5B:
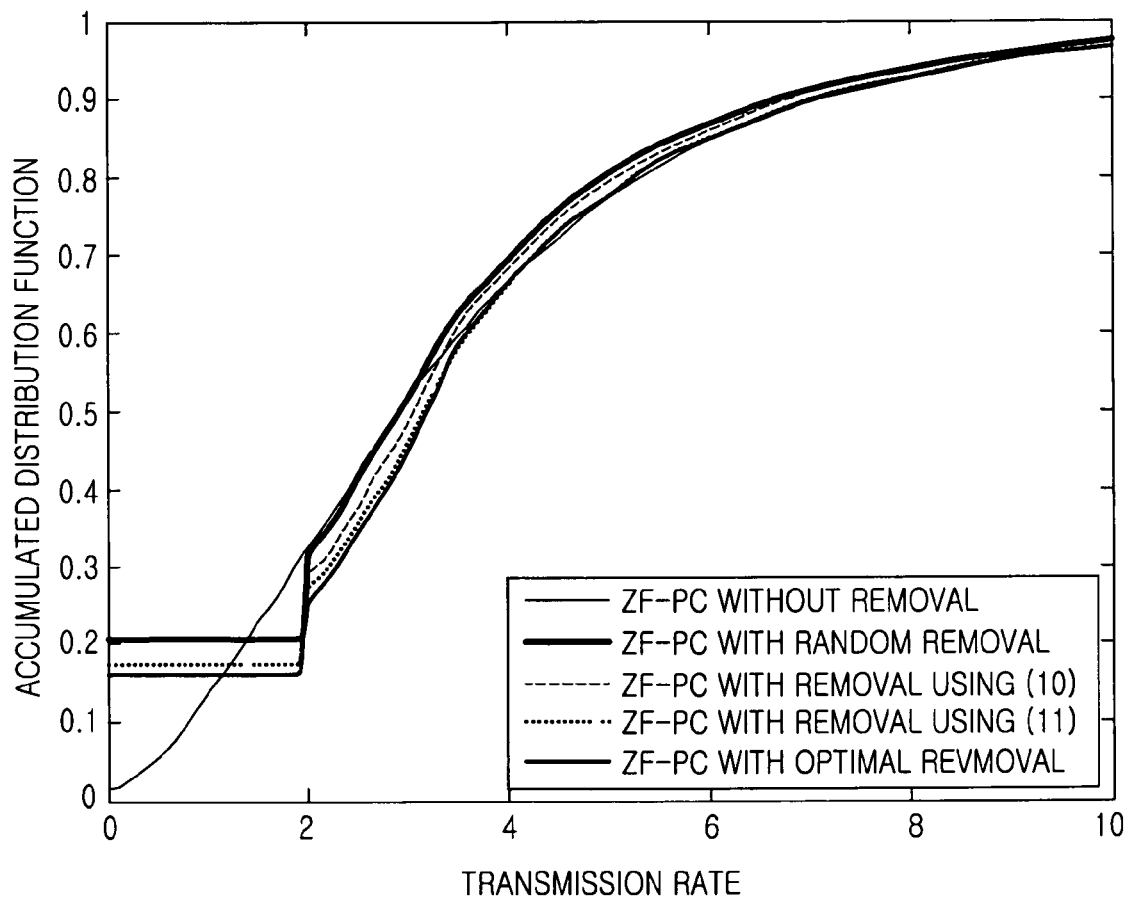
Figure 5C:
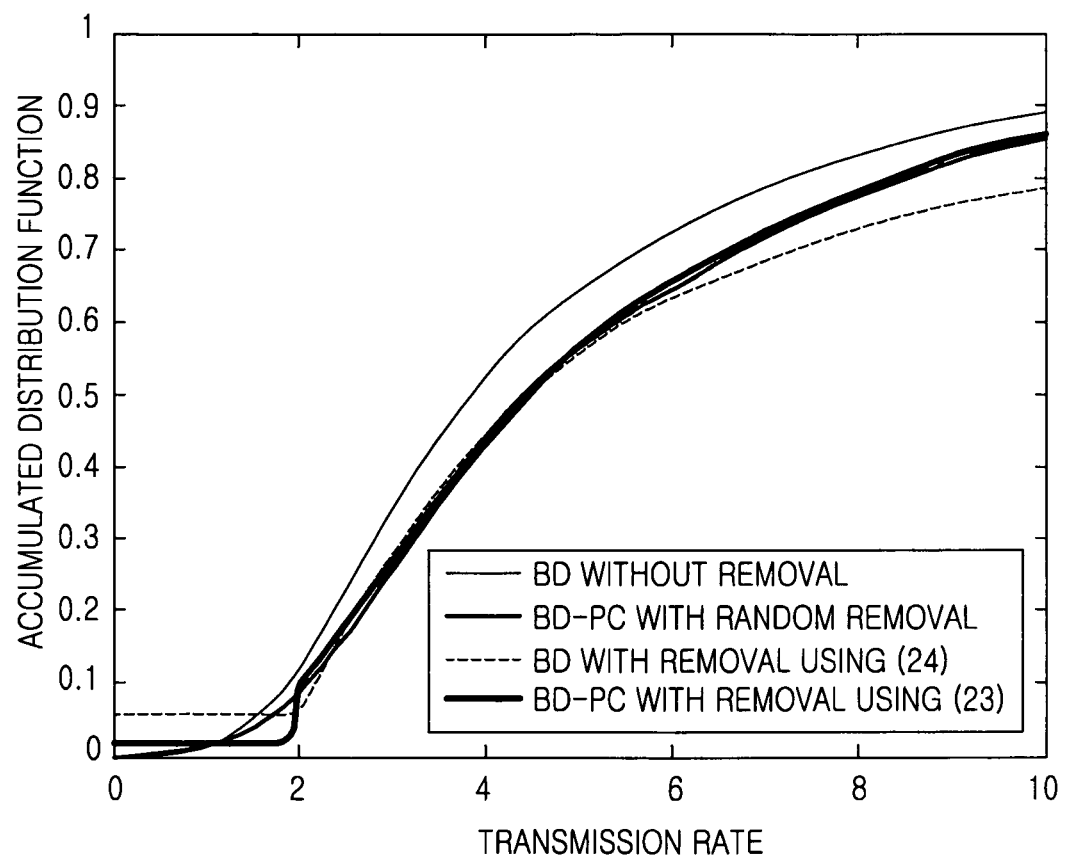

FIGS. 5A to 5C illustrate performance of a distributed MIMO wireless communication system according to an exemplary embodiment of the present invention. FIGS. 5A to 5C illustrate simulated experiment results for a distributed MIMO wireless communication system according to an exemplary embodiment of the present invention. A communication environment assumed in the simulated experiment is described in Table 5.

TABLE 5

| Parameter | value |
| --- | --- |
| The number of multiple accessing terminals | 3 |
| The number of base stations that participates in cooperative transmission | 3 |
| The number of transmission antennas per sector in a base station | ZF: 1/BD: 2 |
| The number of reception antennas in a terminal | ZF: 1/BD: 2 |
| The number of external cells | 58 |
| Limit power of a base station | 43 [dBm] |
| Noise power | −104 [dBm] |
| Path attenuation index | 3.76 |
| Distance between base stations | 500 [m] |
| Minimum transmission rate | 2 [bps/Hz] |

FIG. 5A illustrates an accumulated distribution of a data transmission rate per unit bandwidth of each terminal when various terminal set management technique is applied in the case where a terminal has a single reception antenna. In legend, an optimal removal denotes an optimal terminal set removal technique for removing a terminal in order to meet a constraint condition for a minimum transmission rate of a terminal. At this point, the optimal terminal set is determined with consideration of the number of all cases that may be removed. When the same power is allocated instead of applying a terminal set management technique, a terminal that does not meet a minimum transmission rate of 2 bps/Hz exists at the rate of about 50%. However, when a terminal set management technique is applied, a rate of a terminal that does not meet the minimum transmission rate reduces up to 20% at the maximum. More particularly, when a terminal removal rule of Equation 11, that is, a rule of removing a terminal having a largest power loss or a smallest effective channel gain is applied, a performance that approaches an optimal technique in an aspect of a system yield is achieved.

FIG. 5B illustrates a transmission rate accumulated distribution of each terminal when a Power Control (PC) technique proposed after a terminal set management technique is applied is applied. When transmission-not-allowed probabilities are compared, in the case where a terminal is not removed, a minimum transmission rate is not met at the rate of about 32%, but in the case where a terminal set management technique is combined and a power control is applied, a rate of a terminal that does not meet the minimum transmission rate reduces to 17%.

FIG. 5C illustrates performance comparison when a BD beamforming is applied, a terminal set management technique and a PC technique are applied in the case where a terminal and a base station have two antennas, respectively. In the legend, 'BD without removal' denotes the case where the same power is allocated to data streams of each terminal and a terminal set management technique is not applied, and 'BD-PC without removal' denotes the case where a PC technique for maximizing a system yield is applied. In a transmission rate accumulated distribution of terminals, when the same power is allocated, a terminal that does not meet the minimum transmission rate exists at the rate of about 12%. When a terminal set management technique of Equation 24 is applied, a rate of a terminal that does not meet the minimum transmission rate reduces to 7% or less. Similar to a performance gain by a terminal set management technique for the case of the above ZF-PC, a BD-PC terminal group management technique provides a performance effect of reducing a transmission-not-allowed probability while not reducing a system yield.

A distributed MIMO wireless communication prevents a phenomenon that a terminal does not meet a minimum transmission rate as much as possible through a power control with consideration of limit transmission power for each base station, so that users may receive various large capacity services.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for controlling power of a base station participating in cooperative transmission in a Multiple Input Multiple Output (MIMO) wireless communication system, the method comprising:

determining at least one beamforming matrix for processing transmission signals to terminals included in a terminal set for a multiple access by a plurality of base stations participating in cooperative transmission;

determining minimum transmission power values for a minimum transmission rate of the terminals;

determining total transmission power values for each of the base stations for a case of using the minimum transmission power values according to a power gain by the beamforming matrix;

determining whether each of the total transmission power values exceeds each of limit transmission powers of the plurality of the base stations;

if the total transmission power values do not exceed all of the limit transmission powers, determining transmission power values for respective terminals in a range meeting the limit transmission power of the base stations; and if at least one of the total transmission power values exceed the limit transmission powers, removing one of: a terminal having a largest minimum power value, a terminal having a largest power gain through beamforming, and a terminal having a largest power that each base station allocates in order to satisfy a minimum transmission rate, from the terminal set, wherein the determining of the transmission power values comprises:

determining a temporary power value of the terminal using a Lagrangian multiplier for a constraint condition for the limit transmission power, the beamforming matrix, and noise power experienced by a terminal; and determining a larger one of the temporary power value and a minimum power value of the terminal as a power value of the terminal.

2. The method of claim 1, wherein the determining of the at least one beamforming matrix comprises determining a Zero Forcing (ZF) beamforming matrix by determining an inverse matrix of a channel matrix between base stations participating in the cooperative transmission and multiple accessing terminals.

3. The method of claim 2, wherein the determining of the minimum power values comprises determining one minimum power value per terminal using noise powers experienced by the respective terminals, and minimum transmission rates of the respective terminals.

4. The method of claim 1, wherein the determining of the transmission power values further comprises, for each terminal in the terminal set:

updating the Lagrangian multiplier using the power value, the Lagrangian multiplier, and the beamforming matrix;

re-determining a transmission power value of the terminal using the updated Lagrangian multiplier; and if a transmission power value of the terminal converges, completing transmission power allocation for the terminal.

5. The method of claim 1, wherein the determining of the at least one beamforming matrix comprises performing a Block Diagonalization (BD) operation on channel matrixes between base stations participating in the cooperative transmission and multiple accessing terminals.

6. The method of claim 5, wherein the determining of the minimum power values comprises determining the minimum power values as many as the number of streams per terminal using noise powers experienced by respective terminals, minimum transmission rates of the respective terminals, power that each base station allocates in order to satisfy a minimum transmission rate of a terminal, power gains for each stream of the respective terminals due to beamforming, and effective channel gains of the respective terminals.

7. The method of claim 6, wherein the determining of the minimum power values comprises, for each terminal in the terminal set:

initializing a power to be allocated by each base station in order to satisfy a minimum transmission rate of the terminal, to a medium value of a maximum value and a minimum value of power to be allocated by each base station in order to satisfy the minimum transmission rate of the terminal;

determining a Lagrangian multiplier for a constraint condition for power to be allocated by each base station in order to satisfy the minimum transmission rate of the terminal;

determining minimum power values for each stream of the terminal using the Lagrangian multiplier, a power gain for each stream of the terminal due to the beamforming, noise power experienced by the terminal, and an effective channel gain of the terminal;

determining an optimum transmission rate using minimum power values for each stream, the effective channel gain, and the noise power;

if the minimum transmission rate is equal to or greater than the optimum transmission rate, setting power to be allocated by each base station in order to satisfy a minimum transmission rate of the terminal, to the minimum value, and if the minimum transmission rate is smaller than the optimum transmission rate, setting the power to be allocated by each base station in order to satisfy the minimum transmission rate of the terminal, to the maximum value; and if a difference between the minimum transmission rate and the optimum transmission rate is greater than a threshold, re-determining the minimum power values for each stream.

8. The method of claim 7, wherein the determining of the transmission power values comprises:

determining temporary power values for each stream of the terminals using the Lagrangian multiplier for the constraint condition for the limit transmission power, power gains for each stream of the terminals due to beamforming, noise powers experienced by the terminals, and effective channel gains for each stream of the terminals; and determining a larger one of the temporary power value and the minimum power value as transmission power values for each stream of the terminals.

9. The method of claim 8, wherein the determining of the transmission power values comprises:

determining a total transmission power value for a case of applying transmission power values for each stream of the terminals with consideration of a power gain through the beamforming matrix;

if the total transmission power value exceeds the limit transmission power, updating the terminal set; and re-determining transmission power values for each stream of the terminals.

10. An apparatus of a base station that participates in cooperative transmission in a Multiple Input Multiple Output (MIMO) wireless communication system, the apparatus comprising:

a calculator configured to determine at least one beamforming matrix for processing transmission signals to terminals included in a terminal set for a multiple access by a plurality of base stations participating in cooperative transmission; and an allocator configured to:

determine minimum transmission power values required for satisfying a minimum transmission rate of the terminals;

determine total transmission power values for each of the base stations for a case of using the minimum transmission power with consideration of a power gain by the beamforming matrix;

determine whether each of the total transmission power values exceeds each of limit transmission powers of the plurality of the base stations;

if the total transmission power values do not exceed all of the limit transmission powers, determine transmission power values for respective terminals in a range meeting the limit transmission power of the base stations; and if at least one of the total transmission power values exceeds the limit transmission powers remove one of a terminal having a largest minimum power value, a terminal having a largest power gain through beamforming, and a terminal having a largest power to be allocated by each base station in order to satisfy a minimum transmission rate, from the terminal set, wherein the allocator is further configured to, to determine the transmission power values, determine a temporary power value of the terminal using a Lagrangian multiplier for a constraint condition for the limit transmission power, the beamforming matrix, and noise power experienced by a terminal, and, determines a larger one of the temporary power value and a minimum power value of the terminal as a power value of the terminal.

11. The apparatus of claim 10, wherein the calculator is configured to determine a Zero Forcing (ZF) beamforming matrix by determining an inverse matrix of a channel matrix between base stations participating in the cooperative transmission and multiple accessing terminals.

12. The apparatus of claim 11, wherein the allocator is configured to determine one minimum power value per terminal using noise powers experienced by the respective terminals, and minimum transmission rates of the respective terminals.

13. The apparatus of claim 10, wherein the allocator is further configured to, for each terminal in the terminal set, update the Lagrangian multiplier using the power value, the Lagrangian multiplier, and the beamforming matrix, re-determine a transmission power value of the terminal using the updated Lagrangian multiplier, and if a transmission power value of the terminal converges, complete transmission power allocation for the terminal.

14. The apparatus of claim 10, wherein the calculator is configured to perform a Block Diagonalization (BD) operation on channel matrixes between base stations participating in the cooperative transmission and multiple accessing terminals.

15. The apparatus of claim 14, wherein the allocator is configured to determine the minimum power values as many as the number of streams per terminal using noise powers experienced by respective terminals, minimum transmission rates of the respective terminals, power that each base station allocates in order to satisfy a minimum transmission rate of a terminal, power gains for each stream of the respective terminals due to beamforming, and effective channel gains of the respective terminals.

16. The apparatus of claim 15, wherein the allocator is configured to, for each terminal in the terminal set:

initialize power to be allocated by each base station in order to satisfy a minimum transmission rate of the terminal, to a medium value of a maximum value and a minimum value of power to be allocated by each base station in order to satisfy the minimum transmission rate of the terminal;

determine a Lagrangian multiplier for a constraint condition for power to be allocated by each base station in order to satisfy the minimum transmission rate of the terminal;

determine minimum power values for each stream of the terminal using the Lagrangian multiplier, a power gain for each stream of the terminal due to the beamforming, noise power experienced by the terminal, and an effective channel gain of the terminal;

determine an optimum transmission rate using minimum power values for each stream, the effective channel gain, and the noise power;

if the minimum transmission rate is equal to or greater than the optimum transmission rate, set power to be allocated by each base station in order to satisfy a minimum transmission rate of the terminal, to the minimum value;

if the minimum transmission rate is smaller than the optimum transmission rate, set the power to be allocated by each base station in order to satisfy the minimum transmission rate of the terminal, to the maximum value; and if a difference between the minimum transmission rate and the optimum transmission rate is greater than a threshold, re-determine the minimum power values for each stream.

17. The apparatus of claim 16, wherein the allocator is configured to determine temporary power values for each stream of the terminals using the Lagrangian multiplier for the constraint condition for the limit transmission power, power gains for each stream of the terminals due to beamforming, noise powers experienced by the terminals, and effective channel gains for each stream of the terminals, and determine a larger one of the temporary power values and the minimum power value as transmission power values for each stream of the terminals.

18. The apparatus of claim 17, wherein the allocator is configured to determine a total transmission power value for a case of applying transmission power values for each stream of the terminals with consideration of a power gain through the beamforming matrix, if the total transmission power value exceeds the limit transmission power, updates the terminal set, and re-determine transmission power values for each stream of the terminals.

19. The method of claim 1, wherein each terminal of the terminal set includes one reception antenna.

20. The apparatus of claim 10, wherein each terminal of the terminal set includes one reception antenna.

21. The method of claim 1, wherein the base stations in the plurality of base stations are geographically disbursed, and wherein the MIMO wireless communication system is a distributed MIMO wireless communication system.

22. The apparatus of claim 10, wherein the base stations in the plurality of base stations are geographically disbursed, and wherein the MIMO wireless communication system is a distributed MIMO wireless communication system.

23. The method of claim 1, wherein the plurality of base stations comprises a first base station and a second base station that are geographically disbursed, and wherein a limit transmission power of the first base station is different from a limit transmission power of the second base station.

24. The apparatus of claim 10, wherein the plurality of the base stations comprises a first base station and a second base station that are geographically disbursed, and wherein a limit transmission power of the first base station is different from a limit transmission power of the second base station.

* * * * *